United States Patent [19]

Okamoto et al.

[11] Patent Number: 5,290,856
[45] Date of Patent: Mar. 1, 1994

[54] ENGINEERING RESIN-PROPYLENE POLYMER GRAFT COMPOSITION

[75] Inventors: Kelvin T. Okamoto, Wilmington; Kyle D. Eastenson, Newark; Suhas C. Guyaniyogi, Bear, all of Del.

[73] Assignee: HIMONT Incorporated, Wilmington, Del.

[21] Appl. No.: 869,982

[22] Filed: Apr. 16, 1992

[51] Int. Cl.$^5$ .................... C08L 51/06; C08L 71/02; C08L 53/02

[52] U.S. Cl. ............................ 525/64; 525/66; 525/68; 525/69; 525/70; 525/92; 525/98; 525/99; 525/242

[58] Field of Search ............ 525/68, 63, 66, 70, 525/80, 92, 71, 74, 67

[56] References Cited

U.S. PATENT DOCUMENTS

| | | | |
|---|---|---|---|
| 3,361,851 | 1/1968 | Gowan | 525/132 |
| 3,383,435 | 5/1968 | Cizek | 525/132 |
| 3,658,945 | 4/1972 | Nakashio | 525/68 |
| 3,943,191 | 3/1976 | Cooper | 525/68 |
| 4,166,055 | 8/1979 | Lee, Jr. | 525/92 |
| 4,172,826 | 10/1979 | Haaf | 525/96 |
| 4,383,082 | 5/1983 | Lee, Jr. | 525/92 |
| 4,454,284 | 6/1984 | Ueno et al. | 525/68 |
| 4,483,958 | 11/1984 | Kosaka et al. | 524/409 |
| 4,713,416 | 12/1987 | Del Giudice | 525/68 |
| 4,764,559 | 8/1988 | Yamauchi et al. | 525/92 |
| 4,914,153 | 4/1990 | Togo et al. | 525/68 |
| 4,957,974 | 9/1990 | Illenda et al. | 525/70 |
| 4,962,148 | 10/1990 | Orikasa et al. | 525/64 |
| 5,004,782 | 4/1991 | Mashita et al. | 525/64 |
| 5,021,504 | 6/1991 | Fujita et al. | 525/57 |
| 5,061,753 | 10/1991 | Muruyama et al. | 525/68 |
| 5,071,911 | 12/1991 | Furuta et al. | 525/68 |
| 5,071,912 | 12/1991 | Furuta et al. | 525/68 |
| 5,075,376 | 12/1991 | Furuta et al. | 525/68 |
| 5,079,295 | 1/1992 | Furuta et al. | 525/68 |
| 5,086,112 | 2/1992 | Togo et al. | 525/68 |
| 5,132,363 | 7/1992 | Furuta et al. | 525/68 |
| 5,159,004 | 10/1992 | Furuta et al. | 525/68 |

FOREIGN PATENT DOCUMENTS

| | | |
|---|---|---|
| 0263678 | 4/1988 | European Pat. Off. |
| 0449087 | 10/1991 | European Pat. Off. |
| 0475400 | 3/1992 | European Pat. Off. |

*Primary Examiner*—James J. Seidleck
*Assistant Examiner*—M. L. Warzel

[57] ABSTRACT

Disclosed are resin compositions comprising (a) a polyphenylene ether resin or a polyamide resin or a polyester resin; (b) a glycidyl moiety-styrenic grafted propylene polymer material in combination with a styrenic polymer copolymerized with a glycidyl moiety; optionally (c) (1) one or more monoalkenyl aromatic hydrocarbon-conjugated diene block copolymers, hydrogenated products thereof or mixtures thereof, with or without (2) olefin copolymer rubber; and optionally (d) a propylene polymer material. The compositions exhibit increased resistance to delamination, indicating improved compatibility between the engineering resins and propylene polymer material.

9 Claims, No Drawings

ENGINEERING RESIN-PROPYLENE POLYMER GRAFT COMPOSITION

FIELD OF THE INVENTION

This invention relates to engineering resin compositions comprising (a) a thermoplastic polymer resin selected from the group consisting of polyphenylene ether resin, polyamide resin and polyester resin; (b) a propylene polymer material grafted with glycidyl and styrenic monomers and a styrenic polymer copolymerized with the glycidyl monomer; optionally (c) (1) one or more monoalkenyl aromatic hydrocarbon conjugated diene block copolymers, hydrogenated products thereof or mixtures thereof, with or without (2) olefin copolymer rubber; and, optionally, (d) a propylene polymer material.

BACKGROUND OF THE INVENTION

Polyphenylene ether resin (also known as polyphenylene oxide), polyamide resin (also referred to as nylon) and polyester resin are recognized in the art as engineering plastics having excellent high heat distortion temperature, high stiffness and high strength at elevated temperatures. However, these engineering resins have drawbacks such as poor impact strength, poor processability due to high melt strength, high melting and high glass transition temperatures and poor chemical resistance thereby limiting their fields of application.

In an attempt to improve its properties, polyphenylene ether resin has been blended with other resins. For example, U.S. Pat. No. 3,383,435 discloses a composition comprising polyphenylene ether resin and a polystyrene or a rubber-modified styrene resin, wherein the rubber component is a highly unsaturated rubber, such as, polybutadiene.

U.S. Pat. Nos. 3,658,945 and 3,943,191 disclose compositions comprising polyphenylene ether resin and an EPDM-modified styrene resin. In these patents the EPDM rubber replaces the highly unsaturated rubber used in the U.S. Pat. No. 3,383,435 in an attempt to increase the impact strength. However, no significant improvement was achieved.

Other compositions have been disclosed comprising a polyphenylene ether resin and an EPDM-modified styrene resin with additional components. U.S. Pat. No. 4,172,826 discloses compositions comprising polyphenylene ether resin, EPDM-modified styrene resin, hydrogenated A-B-A block copolymers and, optionally, a filler. In U.S. Pat. No. 4,483,958 the composition disclosed comprises polyphenylene ether resin, EPDM-modified styrene resin, an inorganic filler and a thermoplastic elastomer selected from styrene-conjugated diolefin copolymers and styrene polymer grafted polyolefin.

Various blend compositions of polyolefins and polyphenylene ether resins have been made in an attempt to improve properties, such as impact strength, chemical resistance and melt processability of polyphenylene ether resins. For example, U.S. Pat. No. 3,361,851 to Gowan discloses a composition comprising polyphenylene ether resin and polypropylene, wherein a small quantity of polypropylene is dispersed in the polyphenylene ether resin. The reference teaches that the amount of the polypropylene that can be incorporated is limited to no more than 10% by weight of the total composition and that incorporating amounts of polypropylene exceeding 10% results in phase separation during the molding of such compositions and delamination of the molded articles.

It has also been disclosed that larger amounts of polypropylene can be incorporated in polyphenylene ether resin compositions if elastomeric block copolymers are present and, optionally, polystyrene. Compositions of this kind are described in U.S. Pat. No. 4,166,055; 4,764,559 and 4,383,082 and EPA 263678. These patents teach improved compatibility between the polyolefin and polyphenylene ether and improved impact strength. However, there is a substantial decrease in flexural modulus and heat distortion temperature.

U.S. Pat. No. 4,713,416 to Del Giudice et al. discloses a composition of (a) polyphenylene ether resin, (b) a thermoplastic copolymer other than polystyrene that is incompatible with polyphenylene ether resins, such as crystalline olefin polymers, polycarbonates, aromatic polyesters and polyamides, and (c) a compatibility promoting agent. When the incompatible thermoplastic copolymer is a crystalline olefin polymer the reference teaches using either (a) block copolymers consisting of a vinyl aromatic monomer and a crystalline olefin or (b) the product obtained by grafting a vinyl aromatic monomer onto a crystalline polymer of a $C_2$-$C_6$ olefin.

European Patent Application 449 087 A2, published Oct. 10, 1991, discloses blend compositions of (a) polyphenylene ether resin, a styrene resin or mixtures thereof, (b) a styrenic grafted propylene polymer material, (c) one or more monoalkenyl aromatic hydrocarbon-conjugated diene block copolymers, hydrogenated products thereof or mixtures thereof, and optionally, (d) a propylene polymer material.

U.S. Pat. No. 4,914,153 discloses modified polyphenylene ether compositions wherein the polyphenylene ether is itself modified with a reactant selected from maleic anhydride, glycidyl methacrylate and glycidyl acrylate; further includes a polyolefin modified with styrene and a modifier selected from maleic anhydride, glycidyl methacrylate and glycidyl acrylate; and a binder selected from a broadly disclosed class of compounds not relevant to the instant invention. The reference discloses a broad concentration range for the polyolefin modifier and vinyl or vinylidene compound used in modifying the polyolefin, 0.01 to 50% by weight (col. 6, lines 10-12). Furthermore, the ratio between the polyolefin modifier and vinyl or vinylidene compound is stated to be in the range of 1 to 90% by weight Referring to the examples of the patent, in particular "Referential Examples" 5, 6 and 7, the amount of bonded styrene was 5 5% and bonded glycidyl methacrylate 0.7%. Referential Example 4 describes the method of producing the modified polypropylene and states that the material was extracted with methyl ethyl ketone. The resulting product therefore differed from the instant invention particularly in the absence of a copolymerized styrenic polymer component. The reference also includes performance properties of the compositions, e.g., tensile strength of polyphenylene ether blends with the modified polypropylene (Tables 1 and 2). The level of tensile strength is substantially less than achieved in the present invention.

Blends of polyester resin, e.g., polybutylene terephthalate blended with a modified polypropylene is disclosed in U.S. Pat. No. 5,004,782. However, the modifier for the polypropylene is limited to an unsaturated carboxylic acid or anhydride thereof (particularly, maleic anhydride, col. 2, lines 30-36) and other blend components absent from the instant invention are also required.

Another type of modified polypropylene is disclosed in U.S. Pat. No. 4,957,974 as useful in blends with e.g., polyesters (col. 12, lines 57-59), polyamides or nylons (col. 13, lines 2-4) and polycarbonates (col. 13, line 6). The essential modifier for the polypropylene in that reference is a graft copolymer of a methacrylic ester, e.g., methyl methacrylate and can include an acrylic or styrenic monomer copolymerizable with the ester, including glycidyl methacrylate (col. 7, line 68).

SUMMARY OF THE INVENTION

It has been found that compositions comprising (a) a resin material selected from the group consisting of (i) a polyphenylene ether resin, (ii) a polyamide resin or (iii) a polyester resin; (b) a propylene polymer material grafted with styrenic polymer and a glycidyl moiety and further comprising said styrenic polymer copolymerized with said glycidyl moiety as a discrete component; optionally (c) at least one rubber polymer component comprising (1) at least one of (i) monoalkenyl aromatic hydrocarbon-conjugated diene block copolymers, (ii) hydrogenated products of (i), or (iii) mixtures of (i) and (ii); and (2) optionally an olefin copolymer rubber; and optionally (d) a propylene polymer material, exhibit excellent flexural and tensile strength and flexural modulus, surface appearance and improved compatibility.

One embodiment of the invention provides compositions comprising, by weight, (a) from 10 to 90% of a thermoplastic polymer resin selected from the group consisting of polyphenylene ether resin, a polyamide resin and a polyester resin, (b) from 10 to 90% of a glycidyl methacrylate and styrenic polymer grafted propylene polymer material, including glycidyl methacrylate copolymerized styrenic polymer per se and (c) from about 1 to about 25% of at least one rubber polymer component comprising (1) from about 0 to 100% of at least one of one or more monoalkenyl aromatic hydrocarbon-conjugated diene block copolymers, hydrogenated products thereof or mixtures thereof, and (2) from 0 to about 100% of olefin copolymer rubber wherein the total amount of (a)+(b)+(c) is 100%.

Another embodiment of the invention provides compositions comprising, by weight, (a) from 10 to 90% of a thermoplastic polymer resin selected from the group consisting of a polyphenylene ether resin, a polyamide resin and a polyester resin, (b) from 10 to 90% of a glycidyl methacrylate and styrenic polymer grafted propylene polymer material, including glycidyl methacrylate copolymerized styrenic polymer per se, (c) from 1 to about 25% of at least one rubber polymer component comprising (1) from about 0 to 100% of at least one of one or more monoalkenyl aromatic hydrocarbon-conjugated diene block copolymers, hydrogenated products thereof or mixtures thereof, and (2) from 0 to about 100% of olefin copolymer rubber, wherein up to about 90% of the amount of the propylene polymer material grafted with glycidyl methacrylate co-styrenic polymer which would otherwise be used is replaced with propylene polymer material grafted with styrenic polymer, and wherein the total amount of (a)+(b)+(c) is 100%.

A further embodiment of the invention includes the optional component (d), at from 1 to 70%, of a propylene polymer material, wherein the total amount of (a)+(b)+(c)+(d) is 100%.

The compositions of the invention are useful in the manufacture of molded articles, such as automotive parts, appliances and motor housings and exhibit improved compatibility between the engineering resins and propylene polymer material as shown by resistance of the compositions to delamination.

DETAILED DESCRIPTION OF THE INVENTION

Unless otherwise specified all percentages and parts are by weight in this specification.

The polyphenylene ether resin of component (a) is a homo- or copolymer selected from those having the repeating structural units of the formula:

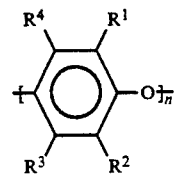

wherein the oxygen ether atom of one unit is connected to the benzene nucleus of the next adjoining unit, n is a positive integer higher than 50, $R_1$, $R_2$, $R_3$, and $R_4$, the same or different from each other, are hydrogen, halogen, hydrocarbon radicals, halohydrocarbon radicals, or halohydrocarboxylic radicals containing at least two carbon atoms between the benzene nucleus and the halogen atom. The preparation of polyphenylene ether resins corresponding to the above structural formula is described in U.S. Pat. Nos. 3,306,874, 3,306,875, 3,257,357 and 3,257,358.

Polyesters suitable for use in the present invention are well known and widely available. They possess chain units which contain an unsubstituted or substituted aromatic ring in polymer chain. Examples of such substituents on the aromatic ring are halogen, such as chlorine or bromine, and $C_1$-$C_4$-alkyl, such as methyl, ethyl, propyl or butyl.

Suitable polyesters can be prepared, for example, by reacting aromatic dicarboxylic acids, their esters or their ester-forming derivatives with hydroxy compounds in a conventional manner.

Examples of aromatic dicarboxylic acids are naphthalenedicarboxylic acids, terephthalic acid and isophthalic acid as well as mixtures of these. The aromatic dicarboxylic acids or their derivatives may be partly replaced, preferably in an amount of up to 10 mol %, by other dicarboxylic acids. Aliphatic or cycloaliphatic dicarboxylic acids, such as adipic acid, azelaic acid, sebacic acid and cyclohexanedicarboxylic acid, may be mentioned as examples here.

Preferably used dihydroxy compounds are glycols of 2 to 6 carbon atoms, in particular ethylene glycol, butane-1,4-diol, but-2-ene-1,4-diol, hexane-1,6-diol, hexane-1,4-diol, cyclohexane-1,4-diol, 1,4-di-(hydroxymethyl)-cyclohexane, 2,2-di-(4'-hydroxyphenyl)-propane and neopentylglycol or mixtures of these.

Preferred polyesters are polyalkylene terephthalates, which are derived from alkanediols of 2 to 6 carbon atoms. Polyethylene terephthalate and polybutylene terephthalate are particularly preferred. The relative viscosity of the polyesters is in general from 1.2 to 1.8, measured in 0.5% strength by weight solution in a phenol/o-dichlorobenzene mixture (weight ratio 3:2) at 25° C. As in the case of component (A), the amount of component (B) in the novel molding materials is not subject to any particular restriction, but not less than 5, preferably from 10 to 89%, by weight, based on (A) to (D), of the polyester are likewise used. Particularly preferred molding materials contain from 15 to 70, very particularly preferably from 25 to 60%, by weight of a thermoplastic polyester. All percentages are based on the total weight of components (A) to (D).

Polyamides suitable for use in the present invention are well known and widely available Basically they may be obtained by polymerizing a monoamino-monocarboxylic acid or a lactam thereof having at least 2 carbon atoms between the amino and carboxylic acid group, or by polymerizing substantially equimolecular proportions of a diamine which contains at least 2 carbon atoms between the amino groups and a dicarboxylic acid; or by polymerizing a monoaminocarboxylic acid or a lactam thereof as defined above together with substantially equimolecular proportions of a diamine and dicarboxylic acid. The dicarboxylic acid may be used in the form of a functional derivative thereof, for example an ester of acid chloride.

The term "substantially equimolecular" proportions (of the diamine and of the dicarboxylic acid) is used to cover both strict equimolecular proportions and slight departures therefrom which are involved in conventional techniques for stabilizing the viscosity of the resultant polyamides.

Examples of the aforementioned monoamino-monocarboxylic acids or lactams thereof which are useful in preparing the polyamides include those compounds containing from 2 to 16 carbon atoms between the amino and carboxylic acid groups, said carbon atoms forming a ring with the —CO—NH— group in the case of a lactam. As particular examples of amino-carboxylic acids and lactams there may be mentioned 6-aminocaproic acid, butyrolactam, pivalolactam, caprolactam, capryllactam, enantholactam, undecanolactam, dodecanolactam and 3- and 4-aminobenzoic acids.

Diamines suitable for use in the preparation of the polyamides include alkyl, aryl and alkyl-aryl diamines. Such diamines include, for example, those represented by the general formula:

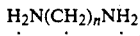

$H_2N(CH_2)_nNH_2$ wherein n is an integer of from 2 to 16, such as trimethylenediamine, tetramethylenediamine, pentamethylenediamine, octamethylenediamine and especially hexamethylenediamine, as well as trimethyl hexamethylene diamine, meta-phenylene diamine, metaxylylene diamine and the like.

The dicarboxylic acids may be aromatic, for example isophthalic and terephthalic acids and aliphatic wherein the aliphatic dicarboxylic acids are of the formula

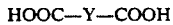

HOOC—Y—COOH wherein Y represents a divalent aliphatic group containing at least 2 carbon atoms, and examples of such acids are sebacic acid, octadecanedoic acid, suberic acid, glutaric acid, pimelic acid and adipic acid. Typical examples of the polyamides or nylons, as these are often called, include for example:
polypyrrolidone (nylon 4)
polycaprolactam (nylon 6)
polycapryllactam (nylon 8)
polyhexamethylene adipamide (nylon 6,6)
polyundecanolactam (nylon 11)
polydodecanolactam (nylon 12)
polyhexamethylene azelaiamide (nylon 6,9)
polyhexamethylene sebacamide (nylon 6,10)
polyhexamethylene isophthalamide (nylon 6,I)
polyhexamethylene terephthalamide (nylon 6,T)
polyamide of hexamethylene diamine and n-dodecanedioic acid (nylon 6,12)

as well as polyamides resulting from terephthalic acid and/or isophthalic acid and trimethyl hexamethylene diamine, polyamides resulting from adipic acid and meta xylylenediamines, polyamides resulting from adipic acid, azelaic acid and 2,2-bis(p-aminocyclohexyl)propane and polyamides resulting from terephthalic acid and 4,4'-diamino-dicyclohexylmethane.

Copolymers of the foregoing polyamides or prepolymers thereof are also suitable for use in the practice of the present invention.

Such copolyamides include copolymers of the following:
hexamethylene adipamide/caprolactam (nylon 6, 6/6)
hexamethylene adipamide/hexamethylene-isophthalamide (nylon 6, 6/6, I)
hexamethylene adipamide/hexamethylene-terephthalamide (nylon 6, 6/6, T)
hexamethylene adipamide/hexamethylene-azelaiamide (nylon 6, 6/6, 9)
hexamethylene adipamide/hexamethylene-azelaiamide/caprolactam (nylon 6, 6/6, 9/6)

Mixtures and/or copolymers of two or more of the foregoing polyamides or prepolymers thereof, respectively, are also within the scope of the present invention. Especially preferred polyamides are the polyamides 6; 6,6; 11; 12 and mixture of at least one crystalline polyamide, e.g. 6; 6,6, and at least one amorphous polyamide, e.g. 6,I; 6,I,T; most preferably polyamide 6,6.

It is also to be understood that the use of the term "polyamides" herein and in the appended claims is intended to include the toughened or super tough polyamides. Super tough polyamides, or super tough nylons, as they are more commonly known, are available commercially, e.g., from E.I. duPont (Zytel ® ST resins), Wilson Fiberfille (NY resins), Badische (ULTRAMID ® resins), among others, or may be prepared in accordance with a number of U.S. Patents including, among others, Epstein—U.S. Pat. No. 4,174,358; Novak—U.S. Pat. No. 4,474,927; Roura—U.S Pat. No. 4,346,194; and Joffrion—U.S. Pat. No. 4,251,644, herein incorporated by reference. These super tough nylons are prepared by blending one or more polyamides with one or more polymeric or copolymeric elastomeric toughening agents. Suitable toughening agents are disclosed in the above-identified U.S. Patents as well as in Caywood, Jr.—U.S. Pat. No. 3,884,882 and Swiger, U.S. Pat. No. 4,147,740 and Galucci et al., "Preparation and Reactions of Epoxy-Modified Polyethylene," J. APPL. POLY. SCI., V. 27, pp. 425–437 (1982) herein incorporated by reference. Typically, these elastomeric polymers and copolymers may be straight chain or branched as well as graft polymers and copolymers, including core-shell graft copolymers, and are characterized as having incorporated therein either by copolymerization or by grafting on the preformed polymer, a monomer having functional and/or active or highly polar groupings capable of interacting with or adhering to the polyamide matrix so as to enhance the toughness of the polyamide polymer.

Component (a) of the invention is present in the amount of from about 10 to about 90% by weight, preferably, from about 20 to about 85%, most preferably from about 30 to about 80% based on the total composition, depending on the balance of properties desired for the particular end use application of the blend. Useful compositions can also be prepared wherein component (a) represents from about 30 to about 65% of the total composition, for example from about 35 to about 60%.

Component (b) of the present invention is a styrenic-glycidyl moiety grafted propylene polymer material in which glycidyl moiety copolymerized with styrenic polymer is present. Styrenic grafted propylene polymer material as used in this specification means those grafted propylene polymer materials wherein the styrenic grafting monomer (or moiety) is selected from the group consisting of styrene, an alkyl ring-substituted styrene where the alkyl is methyl or ethyl, combinations thereof wherein the alkyl ring-substituted styrene is present in an amount of from 5 to 95%, or a combination of styrene or an alkyl ring-substituted styrene with 5 to 40% of alpha-methylstyrene or alpha-methylstyrene derivatives. Preferred grafting monomers are styrene and mixtures of styrene and alpha-methyl styrene The glycidyl moiety to be copolymerized in combination with the styrenic monomer is selected from the group consisting of glycidyl acrylate, glycidyl methacrylate, glycidyl itaconate, allyl glycidyl ether, 2-methallyl glycidyl ether, and p-styryl glycidyl ether; glycidyl methacrylate (GMA) is preferred.

The propylene polymer material backbone of component (b) is selected from the group consisting of (i) a homopolymer of propylene, (ii) a random copolymer of propylene and an olefin selected from ethylene and $C_4$–$C_{10}$ alpha-olefins, provided that, when the olefin is ethylene, the maximum polymerized ethylene content is about 10%, preferably about 4%, and when the olefin is a $C_4$–$C_{10}$ alpha-olefin, the maximum polymerized content thereof is about 20%, preferably about 16%, (iii) a random terpolymer of propylene with two alpha-olefins selected from the group consisting of ethylene and $C_4$–$C_8$ alpha-olefin, provided that the maximum polymerized $C_4$–$C_8$ alpha-olefin content is about 20%, preferably about 16%, and when ethylene is one of said alpha-olefins, the maximum polymerized ethylene content is about 5%, preferably about 4%, (iv) a homopolymer of (i) or a random copolymer of (ii) impact-modified with from about 5 to 30% of an ethylene - propylene copolymer rubber, or an ethylene-propylene-nonconjugated diene monomer rubber having a diene content of about 2-8% The ethylene content of (iv) being from about 20 to about 70%. The $C_4$–$C_{10}$ alpha-olefins include linear and branched $C_4$–$C_{10}$ alpha-olefins such as 1-butene, 1-pentene, 4-methyl-1-pentene, 3-methyl-1-butene, 1-hexene, 3,4-dimethyl-1-butene, 1-heptene, 3-methyl-1-hexene, 1-octene, and the like.

Suitable particulate forms of the grafted propylene polymer material include powder, flake, granulate, spherical, cubic and the like. Preferred are spherical particulate forms prepared from a propylene polymer material having a pore volume fraction of at least about 0.07. Most preferred for preparing the grafted propylene polymer material is a propylene polymer material having (1) a weight average diameter of about 0.4 to 7 mm, (2) a surface area of at least 0.1 $m^2$/g, and (3) a pore volume fraction of at least about 0.07 wherein more than 40% of the pores in the particle have a diameter larger than 1 micron Such propylene polymer materials are commercially available from HIMONT Italia, S.r.l.

The styrene monomer, alkyl ring-substituted styrene monomer or methylstyrene derivative, except alpha-methylstyrene, can be used alone or in combination with each other or with alpha methylstyrene to graft onto the propylene polymer material backbone. All except alpha-methylstyrene and its derivatives readily homopolymerize when used alone and graft copolymerize with each other when two or more are present, including alpha-methylstyrene.

Preferred styrenic-glycidyl grafted propylene polymer materials of the present invention are grafted copolymers of styrene or of styrene and a methylstyrene derivative monomer and glycidyl methacrylate on polypropylene or on an impact-modified polypropylene backbone.

The grafting monomers, styrenic plus glycidyl moieties, are added to the propylene polymer material in a concentration of from about 50 to about 200 parts by weight per hundred (pph) of the propylene polymer material; preferably from about 60 to about 150 pph; most preferably from about 70 to about 120 pph; for example, from about 75 to about 100 pph. The amount of glycidyl moiety added during grafting is expressed as a percentage of the total grafting monomers added, i.e., styrenic plus glycidyl moieties Useful concentrations of added glycidyl moiety is from about 0.1 to about 20 weight percent of said total; preferably from about 0.2 to about 10 weight percent; most preferably from about 0.3 to about 8 weight percent.

As a consequence of the reaction in Which the styrenic and glycidyl moieties are grafted to and copolymerized with the propylene polymer material, there is also produced styrenic polymer copolymerized with the glycidyl moiety (e.g., polystyrene copolymerized with glycidyl methacrylate, PS-co-GMA), as a discrete compositional element of (b). Also present are lesser (minor) quantities of styrenic polymer and ungrafted propylene polymer material. The quantity of styrenic polymer copolymerized with a glycidyl moiety as a compositional element of the grafted propylene polymer material is from about 35 to about 95 weight percent of the total grafting monomer; preferably from about 45 to about 80 weight percent; most preferably from about 50 to about 75 weight percent.

The styrenic-glycidyl grafted propylene polymer material of the present invention is prepared by the free-radical initiated graft polymerization of the grafting monomers, at free-radical sites on propylene polymer material The free-radical sites may be produced by irradiation or by a free-radical generating chemical material, e.g., by reaction with a suitable organic peroxide. The general process for carrying out the grafting of propylene polymer material with a styrenic monomer is described in U.S. Pat. No. 4,990,558, which process is useful herein and is incorporated herein by reference.

According to the method where the free-radical sites are produced by irradiation, the propylene polymer material, preferably in particulate form, is irradiated at a temperature in the range of about 10° to 85° C. with high-energy ionizing radiation to produce free-radical sites in the propylene polymer material. The irradiated propylene polymer material, while being maintained in a substantially non-oxidizing atmosphere, e.g., under inert gas, is then treated at a temperature up to about 100° C. for a period of at least about 3 minutes, with about from 5 to 80% of the particular grafting monomers used, based on the total weight of propylene polymer material and grafting monomers. After the propylene polymer material has been exposed to the monomers for the selected period of time, simultaneously or successively in optional order, the resultant grafted propylene polymer material, while still maintained in a substantially non-oxidizing environment, is treated to deactivate substantially all of the residual free radicals therein, and any unreacted grafting monomer is removed from said material.

The free-radical deactivation of the resulting graft copolymer is conducted preferably by heating, although it can be accomplished by the use of an additive, e.g., methyl-mercaptan, that functions as a free-radical trap. Typically the deactivation temperature will be at least 110° C., preferably at least 120° C. Heating at the deactivation temperature for at least 20 minutes is generally sufficient.

Any unreacted grafting monomer is removed from the graft copolymer, either before or after the radical deactivation, or at the same time as deactivation. If the removal is effected before or during deactivation, a substantially non-oxidizing environment is maintained.

In the method where the free-radical sites are produced by an organic chemical compound, the organic chemical compound, preferably an organic peroxide, is a free-radical polymerization initiator which has a decomposition half-life of about 1 to 240 minutes at the temperature employed during the treatment Suitable organic peroxides include acyl peroxides, such as benzoyl and dibenzoyl peroxides; dialkyl and aralkyl peroxides, such as di-tert-butyl peroxide, dicumyl peroxide, cumyl butyl peroxide, 1,1-di-tert-butylperoxy-3,5,5-trimethyl-cyclohexane, 2,5-dimethy 1-2,5-di-tert-butylperoxyhexane, and bis(alpha-tert-butyl peroxyisopropylbenzene); peroxyesters, such as tert-butylperoxypivalate,tert-butylperbenzoate,2,5-dimethylhexyl 2,5-di(perbenzoate), tert-butyl-di(perphthalate), tert-butylperoxy-2-ethylhexanoate; and 1,1-dimethyl-3-hydroxybutylperoxy-2-ethyl hexanoate; and peroxy carbonates, such as di(2-ethylhexyl) peroxy dicarbonate, di(n-propyl)peroxydicarbonate, and di(4-tert-butylcyclohexyl)peroxy dicarbonate. The peroxides can be used neat or in a diluent medium, having an active concentration of from 0.1 to 6.0 pph, preferably from 0.2 to 3.0 pph. Particularly preferred is tert-butyl peroctoate as a 50 weight % dispersion in mineral oil, sold commercially under the brand Lupersol PMS. According to this method, the propylene polymer material, preferably in particulate form, at a temperature of from about 60° C. to 125° C. is treated with from 0.1 to 6.0 pph of a free-radical polymerization initiator described above. The polymer material is treated with the grafting monomers at a rate of addition that does not exceed 4.5 pph per minute at all addition levels monomers, over a period of time which coincides with, or follows, the period of treatment with the initiator. In other words, the monomers and initiator may be added to the heated propylene polymer material at the same time or the monomer may be added 1) after the addition of the initiator has been completed, 2) after addition of the initiator has started but has not yet been completed, or 3) after a delay time or hold time subsequent to the completion of the initiator addition.

After the propylene polymer material has been grafted, the resultant grafted propylene polymer material, while still maintained in a substantially non-oxidizing environment, is treated, preferably by heating at a temperature of at least 120° C. for at least 20 minutes, to decompose any unreacted initiator and deactivate residual free radicals therein. Any unreacted grafting monomer is removed from said material, either before or after the radical deactivation, or at the same time as deactivation.

Component (c) according to the present invention is selected from one or more monoalkenyl aromatic hydrocarbon- conjugated diene block copolymers of linear or branched A-B or A-B-A types or radial (A-B)$_n$ where n=3-20, and hydrogenated products thereof or mixtures thereof, where A is a monoalkenyl aromatic hydrocarbon polymer block and B is a conjugated diene polymer block. Typical monoalkenyl aromatic hydrocarbon monomers are styrene, $C_1$–$C_4$ linear or branched alkyl ring-substituted styrene and vinyl toluene. Suitable conjugated dienes are butadiene and isoprene.

The monoalkenyl aromatic hydrocarbon-conjugated diene block copolymers have a number average molecular weight of from 45,000 to 260,000 wherein the proportion of the monoalkenyl aromatic hydrocarbon monomer in the monoalkenyl aromatic hydrocarbon conjugated diene block copolymer ranges from 5 to 50%, preferably from 15 to 40%, and more preferably from 25 to 40%. When a mixture is desired, two or more block copolymers or hydrogenated products thereof in various amounts and types can be used. When a mixture is used it is preferably used in the ratio of about 3:1 to about 1:3, more preferably about 2:1 to about 1:2.

The monoalkenyl aromatic hydrocarbon-conjugated diene block copolymer and their hydrogenated derivatives used in the composition of the present invention are commercially available. The linear block copolymers are preferred.

The block copolymers can be synthesized according to the methods in U.S. Pat. No. 3,459,830 and 3,994,856. The method for hydrogenation of the conjugated diene block is also known in the art. The hydrogenation catalyst which can be used includes noble metal catalyst, such as platinum, nickel catalyst and copper-chromium catalyst Specific examples of the methods for hydrogenation are described in U.S. Pat. No. 4,188,432.

The rubbery polymer which can be used in component (c) of the present invention also may comprise two or more types of polymer rubbers, provided that at least about 20, and preferably at least about 50, percent of the component is at least one monoalkenyl aromatic hydrocarbon-conjugated diene block copolymer. An especially preferred rubber component is one comprised of about from 20 to 70, more preferably about 50 to 70, percent of a monoalkenyl aromatic hydrocarbon-conjugated diene block copolymer and about from 80 to 30 percent of an EPM or EPDM olefin copolymer rubber. A rubber component comprised of the block copolymer and, instead of the olefin copolymer rubber, a butyl rubber or a random copolymer of butadiene styrene (SBR) may be used in the composition. The ethylene-propylene monomer rubber used in the preferred composition of the invention is an elastomer typically having an ethylene/propylene weight percent ratio in the range of from about 25/75 to about 75/25, preferably from about 40/60 to about 60/40, and an intrinsic viscosity in the range of from about 2.0 to 6.0, preferably from about 2.5 to about 4.0 dl/g.

When component (c) is present in the composition of the present invention, it is used in an amount of from 1 to about 20% by weight based on the total composition; preferably from about 2 to about 15 weight %; most preferably from about 4 to about 12% by weight, depending on the properties to be achieved.

The propylene polymer material useful in the present invention as component (d) includes crystalline homopolymers of propylene, random copolymers of propylene with other alpha-olefin(s) or diene monomers, random terpolymers of propylene with two different monomers selected from the group consisting of ethylene, other alpha-olefins and diene monomers wherein at least one different monomer is ethylene or other alpha-olefin, and impact-modified propylene polymers. These polymer materials generally have a crystallinity (by x-ray diffraction) of about 15% or greater.

The other alpha-olefins useful in the preparation of the random copolymers of propylene include ethylene and $C_4$-$C_{10}$ alpha-olefins. When ethylene is the other alpha-olefin, the ethylene content is no more than about 10%, preferably about 4%, and when the other alpha-olefin is $C_4$-$C_{10}$, the content is no more than about 20%, preferably about 16%. The diene monomer of the random copolymer of propylene can be a $C_4$-$C_{10}$ linear diene, such as butadiene and decadiene, wherein the copolymer has a diene content up to about 5%, preferably about 4%; butadiene is preferred.

In the random terpolymer of propylene and ethylene with other alpha-olefins or propylene with two different other alpha-olefins, the other alpha-olefins can be $C_4$-$C_{10}$ alpha-olefins. The propylene/ethylene/other alpha-olefins-random terpolymers have a maximum ethylene content of 5%, preferably 3%, and a maximum $C_4$-$C_{10}$ alpha-olefin content of 20%, preferably 16%. In the propylene/two different other alpha-olefins terpolymers, the total content of the other alpha-olefins is 25%, preferably 19%. The random terpolymers of propylene and ethylene or other alpha-olefins with a diene monomer contains from up to 5% of a diene monomer, such as 5-ethylidene-2-norbornene and dicyclopentadiene.

The $C_4$-$C_{10}$ alpha-olefins useful in the preparation of the random and terpolymers of propylene can be linear or branched, such as 1-butene, 1-pentene, 4-methylpentene-1, 3-methyl-1-butene, 1-hexene, 3,4-dimethyl-1-butene and 1-octene.

The impact-modified propylene polymers comprise a homopolymer of propylene or a random copolymers of propylene with ethylene or a $C_4$-$C_{10}$ alpha-olefins as described above, which is impact-modified with 10-60% of ethylene-propylene copolymer rubber (EPR) or ethylene-propylene non-conjugated diene monomer rubber (EPDM) having an ethylene content of 20-70%, and in the case of EPDM a diene content of 2-8%.

Exemplary non-conjugated dienes include 1,4-hexadiene, 5-ethylidene-2-norbornene and dicyclopentadiene.

The impact-modified propylene polymer can be prepared by first polymerizing the propylene or a random copolymer of propylene and then polymerizing the propylene and ethylene with or without a diene monomer in the presence of the homopolymer of propylene or a random copolymer of propylene. The impact-modified propylene polymer can be produced in a single reactor or series of reactors. In the alternative, the propylene homopolymer or random copolymer with an alpha-olefin(s) or a diene, and the EPR or EPDM can be prepared separately and then mixed by melt-kneading.

The preferred propylene polymer materials are crystalline propylene homopolymer and ethylene/propylene rubber impact modified polypropylene homopolymer.

When used, the propylene polymer material is present in an amount of from about 1 to about 70% of the total composition, and preferably, from about 5 to about 55%; more preferably from about 10 to about 45%.

The compositions of the present invention are prepared by mechanically blending the components in conventional mixing equipment, i.e., a single or twin screw extruder, Banbury mixer or any other conventional melt compounding equipment. The order in which the components of the composition are mixed is not critical.

Conventional fillers, reinforcing agents, heat and light stabilizers, colorants, additives and processing aids may be included in the compositions in effective amounts.

The present invention will be illustrated in greater detail with reference to the examples of the invention set forth below.

EXAMPLES

Preparation of Grafted Polypropylene

Crystalline polypropylene (PP) homopolymer with a melt flow rate of 6.8 dg/min. was used as the "backbone" polymer for grafting.

| Graft[a] | PP-g-PS | PP-g-P(S-co-GMA) |
|---|---|---|
| Reaction temperature, °C. | 112-115 | 115-120 |
| Styrene charge, pph | 85 | 80.8 |
| GMA charge,[b] pph | — | 4.2 |
| Monomer feed rate, pph/min. | 1 | 1 |
| Active Initiator,[c] pph | 1.5-2.0 | 1.9 |

[a]PS = polystyrene; GMA = glycidyl methacrylate. pph = parts per hundred of resin.
[b]Amount shown is approximately 5.0 wt % based on 85 pph (GMA + Styrene) added. Additional grafts also prepared at 0.5 and 1.0 wt. %
[c]Lupersol PMS; corresponds to 90:1 monomer:initiator molar ratio.

Preparation of Blend Formulations (Table 1)

Blend components (1500 g) hand mixed and shaken in containers prior to extrusion in Haake System 90 mixing twin-screw extruder. Temperature profile: 218° C. feed zone, 288° C. mixing zones, 302° C. die, Screw speed 125-150 rpm.

Sample Molding

Tables 1,3: Battenfeld brand injection molding machine, 5-oz. barrel, 70-ton clamping pressure, using pellets pre-dried at 100° C. for 2-4 hours. Barrel temperature 288° C., mold coolant 82° C. (set points).

Tables 2,4: Battenfeld brand injection molding machine, 1.5-oz. barrel, 25-ton clamping pressure. Barrel temperature 232° C. (288° C. for Table 4), mold coolant 60° C.

Sample Types/Tests

The physical properties set forth in the Tables were measured by the following methods:
Tensile Strength: ASTM D-638
Tensile Elongation: ASTM D-638
Flexural Modulus: ASTM D-790
Flexural Strength: ASTM D-790
HDT: ASTM D-648
Notched Izod: ASTM D-256

In addition, the following is noted:
Izod: notched, unnotched, double-gated unnotched using ⅛" Izod bars cut from the center of appropriately gated ASTM Type I tensile bars (5-oz. Battenfeld). Izod bars directly molded for notched and unnotched testing using 1.5 oz. Battenfeld. Notches cut in after molding. Unnotched tested using 10 lb. hammer; notched and double-gated unnotched tested using 2 lb. hammer.

Flex: molded ⅛" flex bar; test rate 0.5 in/min. (12.7 mm/min.)

Tensile: ASTM Type I bar; single or double gated; extension rate 2 in/min. (50.8 mm/min.)

Polymer Identification

PPE: Polyphenylene ether (Mitsubishi Gas Chemical Co., Japan and Spolana, Czechoslovakia).

PBT: Polybutylene terephthalate (Pibiter N100, Montedipe)

PET: Polyethylene terephthalate (recycled pellets, Star Plastics)

Nylon 6: Polycaprolactam

HIPS: High Impact Polystyrene, polystyrene-polybutadiene graft copolymer (Dow 478 HIPS, Dow Chemical Co.)

Kraton Styrene block copolymer; grade G1650=styrene-ethylene/butylene-styrene triblock (hydrogenated styrene/hexadiene/styrene triblock); grade G1701=styrene-ethylene/propylene diblock (hydrogenated styrene/isoprene diblock) (Shell Chemical Co.)

EXAMPLE 1

Blends were prepared according to the formulations shown in Table 1; the concentrations are in weight percent. The formulation included polymers employed as impact modifiers, Kraton block copolymers and Dow 478 High Impact Polystyrene (HIPS). Comparative compositions A and B were included as well, formulations in which the blended polymer was limited to HIPS in A and in B was a polypropylene grafted with polystyrene, PP-g-PS (this grafted polypropylene is understood to contain polystyrene as well). Blend 83-1 included the polypropylene graft of the instant invention, PP-g-P(S-co-GMA), in which 0.5 wt. % of glycidyl methacrylate (GMA) was used during grafting (as described previously, weight % GMA based on total grafting monomers, styrene and GMA). The other concentrations of GMA evaluated were 1.0 and 5.0 wt. %. In addition, mixtures of grafted polypropylene were evaluated in which PP-g-PS replaced 50% (83-2) and 90% (83-3) of the PP-g-P(S-co-GMA) grafts to obtain a nominal GMA level of 0.5 wt. %.

In addition to the overall balance of desirable properties which can be obtained using the GMA-containing graft copolymers of the instant invention, it is particularly noteworthy that blends with PPE examined after testing showed a total absence of delamination.

TABLE 1

| Sample 83- | A | B | 1 | 2 | 3 |
|---|---|---|---|---|---|
| Formulation (wt. %)[a] | | | | | |
| Dow 478 HIPS | 56.16 | — | — | — | — |
| PPE | 37.44 | 35.34 | 35.34 | 35.34 | 35.34 |
| PP-g-PS | — | 53.00 | — | 26.50 | 47.70 |
| PP-g-P(S-co-GMA)(0.5%) | — | — | 53.00 | — | — |
| PP-g-P(S-co-GMA)(1.0%) | — | — | — | 26.50 | — |
| PP-g-P(S-co-GMA)(5.0%) | — | — | — | — | 5.30 |
| Physical Properties | | | | | |
| Tensile Elongation, % | | | | | |
| single gated | 51 | 46 | 29 | 32 | 47 |
| double gated | 6.3 | 4.9 | 4.9 | 4.9 | NA |
| Tensile Strength, MPa | | | | | |
| single gated | 52.8 | 38.1 | 38.2 | 38.1 | 38.7 |
| double gated | 40.0 | 22.7 | 23.6 | 23.5 | NA |
| % retention | 56 | 61 | 62 | 62 | NA |

TABLE 1-continued

| Sample 83- | A | B | 1 | 2 | 3 |
|---|---|---|---|---|---|
| Flex Strength, Mpa | 84.0 | 61.3 | 64.7 | 64.6 | 63.3 |
| Flex Modulus, Mpa | 2290 | 1700 | 1830 | 1800 | 1760 |
| Notched Izod, J/m | 272 | 230 | 187 | 176 | 224 |
| Unnotched Izod, J/m | NB | NB | NB | NB | NB |
| Double-gated Unnotched Izod, J/m | 112 | 75 | 48 | 53 | 69 |

[a]Each blend stabilized with Irganox 1010, a phenolic stabilizer (Ciba Geigy)-0.20 wt. % and P-EPQ, a phosphonite stabilizer (Sandoz and Ciba Geigy); and impact modified with Kraton G 1650-3.75 wt. %, Kraton G 1701-7.50 wt. % except A: Kraton G 1650-6.00 wt. %.
[b]NA = Not Available; NB = No Break

EXAMPLE 2

Samples of polypropylene grafted with polystyrene only and with polystyrene and glycidyl methacrylate (GMA) were evaluated unblended. Properties are summarized in Table 2.

TABLE 2

| Sample 79-3- | A | 1 | 2 | 3 |
|---|---|---|---|---|
| Formulation, wt. %[a] | | | | |
| PP-g-PS | 99.82 | — | — | — |
| PP-g-P(S-co-GMA)(0.5% GMA) | — | 99.82 | — | — |
| PP-g-P(S-co-GMA)(1.0% GMA) | — | — | 99.82 | — |
| PP-g-P(S-co-GMA)(5.0% GMA) | — | — | — | 99.82 |
| Physical Properties | | | | |
| Tensile Elongation | | | | |
| single-gated | 7.5 | 7.4 | 8.1 | 9.5 |
| double-gated | 2.9 | 2.8 | 2.6 | 3.3 |
| Tensile Strength | | | | |
| single-gated | 43.7 | 43.3 | 45.1 | 44.8 |
| double-gated | 22.8 | 21.6 | 20.5 | 23.4 |
| % retention | 52 | 50 | 45 | 52 |
| Flex Strength | 77.2 | 77.5 | 774.9 | 77.3 |
| Flex Modulus | 2430 | 2370 | 2390 | 2310 |
| Notched Izod (Izod bar), J/m | 9.6 | 9.1 | 12.3 | 11.7 |
| Unnotched Izod, J/m | 53 | 64 | 80 | 91 |
| Double-gated Unnotched Izod, J/m | 30 | 27 | 23 | 36 |

[a]Each polymer stabilized with Irganox 1010-0.10 wt. % and P-EPQ-0.08 wt. %.

EXAMPLE 3

Polypropylene grafted with polystyrene-GMA (0.5 wt. % GMA added) was blended at 59.4 wt. % with polyphenylene ether at 39.6 wt. %; no impact modifier was included. The composition was stabilized with 0.5 wt. % each of Irganox 1010 and P-EPQ. Sample preparation was carried out using the Leistritz brand, 34 mm, co-rotating, intermeshing, twin screw extruder using temperature conditions similar to those shown above. The properties obtained are summarized in Table 3.

TABLE 3

| Properties | |
|---|---|
| Tensile Elongation, % | 15 |
| Tensile Strength, MPa | 61 |
| Flex Strength, MPa | 69 |
| Flexural Modulus, MPa | 2750 |
| Notched Izod, J/m | 64 |
| Unnotched Izod, J/m | 790 |
| Heat Distortion Temp., °C. @(.45 Mpa)/(1.82 MPa) | 139/120 |

EXAMPLE 4

Polypropylene grafted with polystyrene-GMA was blended with PPE and impact stabilizers according to the formulations listed in Table 4. Samples were prepared as described above using the Haake extruder. Molding was performed using a 1.5 oz, 20 ton Battenfeld injection molding machine with barrel temperature at 288° C. and coolant set at 60° C. Examination of samples after testing showed that delamination of the blends was markedly reduced even with as little as 0.5% GMA added during grafting. The reference composition without GMA, 73-B, resulted in a multi-layered structure when blended with PPE. At GMA levels higher than 1%, properties were observed to decrease.

TABLE 4

| Sample 73 - | A | B | 1 | 2 | 3 | 4 |
|---|---|---|---|---|---|---|
| Formulation, wt. %[a] | | | | | | |
| PPE | 37.44 | 33.84 | 33.84 | 33.84 | 33.84 | 33.84 |
| Dow 478 HIPS | 56.16 | — | — | — | — | — |
| PP-g-PS | — | 50.76 | — | — | — | — |
| PP-g-P(S-co-GMA)(5:0%) | — | — | 50.76 | — | — | — |
| PP-g-P(S-co-GMA)(2.0%) | — | — | — | 50.76 | — | — |
| PP-g-P(S-co-GMA)(1.0%) | — | — | — | — | 50.76 | — |
| PP-g-P(S-co-GMA)(0.5%) | — | — | — | — | — | 50.76 |
| Physical Properties[b] | | | | | | |
| Tensile Elongation | | | | | | |
| single-gated | 66 | 280 | 11 | 8 | 11 | 33 |
| double-gated | 1.8 | 1.5 | 1.8 | 1.6 | 1.2 | 1.4 |
| Tensile Strength | | | | | | |
| single-gated | 50.8 | 38.1 | 31.1 | 35.1 | 38.9 | 41.7 |
| double-gated | 35.6 | 23.4 | 22.9 | 22.6 | 21.6 | 22.7 |
| % retention | 70 | 61 | 74 | 64 | 56 | 54 |
| Flex Strength | 86.1 | 66.3 | 54.5 | 60.0 | 67.0 | 69.4 |
| Flex Modulus | 2230 | 1870 | 1700 | 1770 | 1890 | 1910 |
| Notchd Izod, J/m | 160 | 304 | 144 | 166 | 219 | 262 |
| Unnotched Izod, J/m | NB | NB | 935 | 1070 | 1255 | NB |
| Double-gated | 91 | 80 | 96 | 69 | 69 | 75 |
| Unnotched Izod, J/m | | | | | | |

[a]Each blend contains Kraton G1651-7.50% wt. %, Kraton G1701-7.50 wt. % except reference compound A which contains Kraton G1652-6.0 wt. %. All Blends contain Irganox 1010 and P-EPQ-0.20 wt. % each.
[b]NB = No Break

EXAMPLE 5

Polypropylene grafted with styrene and glycidyl methacrylate (GMA) monomers were blended with polybutylene terphthalate (PBT). Blends of 60 and 80 weight % PBT were evaluated and GMA concentrations of 5,2,1 and 0.5 weight % as described previously. Blends were prepared as described above using the Haake extruder. Materials were dried for 2 hours at 100° C. before molding in a Battenfeld machine. Parts were conditioned at 50% humidity and 73° F. for 48 hours before testing.

PBT blends (Table 5) showed excellent compatibility based on the absence of delamination in molded parts and excellent surface appearance. Weldline strength values were highest in blends based on 5% GMA. Modulus and strength properties increased with increasing GMA level up to 2 wt. % in the 60 wt. % PBT blends and continued to increase up to 5 wt. % GMA in the 80 wt. % PBT blends.

Additional blends were prepared containing 90 wt. % or 10 wt. % PBT and polypropylene grafted with styrene and GMA; PP-g-P(S-co-GMA) as described previously. Comparative blend compositions were prepared using PBT and ungrafted polypropylene (PP) homopolymer or polypropylene grafted only with styrene (PP-g-PS). The formulations and results are summarized in Table 6.

Recycled polyethylene terephthalate (PET) blends (Table 7) were prepared using polypropylene (PP) grafted with styrene and 5 wt. % GMA; comparative blends were also prepared containing recycled PET and ungrafted PP homopolymer. Delamination is one of the most obvious signs of incompatibility. Examination of the fracture and external surfaces of test samples can be used to qualitatively compare compatibility of the blends. The ungrafted PP blends all had a characteristic peeling effect indicating delamination whereas fracture surfaces of the styrene/GMA grafted PP blends were smooth and without the appearance of delamination. Sample preparation was carried out as described above.

TABLE 5

| Sample | A | 1 | 2 | 3 | 4 | 5 | 6 | 7 | 8 |
|---|---|---|---|---|---|---|---|---|---|
| Formulation[a], g | | | | | | | | | |
| PBT | 998.0 | 598.8 | 798.4 | 598.8 | 798.4 | 598.8 | 798.4 | 598.8 | 798.4 |
| PP-g-P(S-co-GMA) | | | | | | | | | |
| 5% GMA | — | 399.2 | 199.6 | — | — | — | — | — | — |
| 2% GMA | — | — | — | 399.2 | 199.6 | — | — | — | — |
| 1% GMA | — | — | — | — | — | 399.2 | 199.6 | — | — |
| 0.5% GMA | — | — | — | — | — | — | — | 399.2 | 199.6 |
| PROPERTIES | | | | | | | | | |
| Flexural Modulus (MPa) | 2665 | 2556 | 2704 | 2593 | 2646 | 2490 | 2641 | 2501 | 2651 |
| Flexural Strength (MPa) | 100.5 | 92.4 | 97.1 | 95.0 | 95.8 | 91.1 | 95.8 | 91.2 | 96.8 |
| Notched Izod (J/m) | 37 | 23 | 27 | 21 | 25 | 22 | 26 | 23 | 26 |
| Tensile Strength | | | | | | | | | |
| Single gated (MPa) | 60.5 | 55.1 | 57.9 | 55.3 | 56.8 | 54.0 | 57.3 | 54.1 | 57.0 |
| Dual Gated (MPa) | 60.7 | 23.7 | 36.2 | 21.6 | 25.3 | 20.5 | 25.0 | 20.3 | 25.3 |
| Weldline Retention (%) | 100 | 43 | 63 | 39 | 45 | 38 | 44 | 37 | 44 |

[a]All samples stabilized with 1 g each of P-EPQ and Irganox 1010 PBT = Pibiter N100

TABLE 6

| Sample 87- | 1 | 2 | 3 | 4 | 5 | 6 |
|---|---|---|---|---|---|---|
| Formulation[a], wt. % | | | | | | |
| PBT | 90 | 10 | 90 | 10 | 90 | 10 |
| PP Homopolymer | 10 | 90 | — | — | — | — |
| PP-g-PS[b] | — | — | 10 | 90 | — | — |
| PP-g-P(S-co-GMA)[c] | — | — | — | — | 10 | 90 |
| Properties | | | | | | |
| Tensile Strength | | | | | | |
| Single Gated (MPa) | 47.4 | 34.6 | 54.4 | 46.2 | 56.1 | 46.7 |
| Dual Gated (MPa) | 34.9 | 20.3 | 43.8 | 22.7 | 46.7 | 18.8 |
| Weldline Retention (%) | 74 | 59 | 81 | 49 | 83 | 40 |
| Flexural Strength (MPa) | 86.2 | 55.5 | 92.9 | 79.4 | 95.2 | 77.6 |
| Flexural Modulus (MPa) | 2485 | 1675 | 2639 | 2420 | 2684 | 2267 |
| Notched Izod (J/m) | 29.9 | 31.0 | 23.0 | 13.4 | 29.4 | 12.8 |
| Weldline Izod (J/m) | 75.3 | 66.8 | 63.5 | 26.2 | 67.3 | 30.4 |

[a]Polybutylene terephthlate (PBT), Pibiter N100 (Montedipe); each sample stabilized with P-EPQ (.08 pph), Irganox 1010 (.07 pph) and DSTDP (.25 pph)
[b]Grafting conditions: 112° C., 1.5 pph Lupersol PMS, 85 pph styrene @ 1 pph/min.
[c]Grafting conditions: 120° C., 1.9 pph Lupersol PMS, 80.8 pph styrene/4.2 pph GMA @ 1 pph/min.

TABLE 7

| Sample | A | B | C | D | E | F | 1 | 2 | 3 |
|---|---|---|---|---|---|---|---|---|---|
| Formulation[a], g | | | | | | | | | |
| Recycled PET | 998.0 | — | — | 249.5 | 499.0 | 748.5 | 249.5 | 499.0 | 748.5 |
| Polypropylene | — | 998.0 | — | 748.5 | 499.0 | 249.5 | — | — | — |
| PP-g-P(S-co-GMA) 5% GMA | — | — | 998.0 | — | — | — | 748.5 | 499.0 | 249.5 |
| Properties | | | | | | | | | |
| Flexural Modulus (MPa) | 2814 | 1300 | 2305 | 1791 | 1840 | 2166 | 2414 | 2455 | 2490 |
| Flexural Strength (MPa) | 103.5 | 44.2 | 73.7 | 60.0 | 63.8 | 73.9 | 76.2 | 85.7 | 94.0 |
| Notched Izod (J/m) | 26 | 20 | 11 | 19 | 32 | 25 | 18 | 10 | 27 |
| Tensile Strength | | | | | | | | | |
| Single Gated (MPa) | 48.3 | 32.7 | 42.7 | 34.8 | 42.0 | 47.5 | 47.1 | 52.7 | 60.1 |
| Dual Gated (MPa) | 67.4 | 31.2 | 25.1 | 12.5 | 7.5 | 10.5 | 16.1 | 18.4 | 35.0 |
| Weldline Retention (%) | 140 | 96 | 59 | 36 | 18 | 22 | 34 | 35 | 58 |
| Heat Distortion Temp. @ 264 psi (°C.) | 67 | 53 | 71 | 63 | 68 | 69 | 69 | 68 | 66 |

[a]Each sample stabilized with 1.0 g each of P-EPQ and Irganox 1010  PET = Commercially recycled product

EXAMPLE 6

Polypropylene grafted with styrene and glycidyl methacrylate (GMA) monomers was blended with nylon 6. The levels of GMA were 0.5, 1.0, 2.0 and 5.0 wt. % based on the total styrene and GMA monomers added. Nylon blends of 25% nylon/75% grafted polypropylene (PP) were evaluated comparing the effect of GMA concentration at 0.5, 1.0 and 2.0 wt. %. A polypropylene graft in which 5.0 wt. % GMA was added during grafting was evaluated in nylon/PP graft blend ratios of 25/75, 50/50, 75/25 and 100% PP graft. Results are reported in Table 8. The nylon 6 was dried overnight at 100° F. before mixing which was carried out on the Haake extruder as described above. Blends were dried for at least two hours at 100° C. before injection molding on the 1.5-oz. Battenfeld machine as described above. Parts were conditioned at 50% humidity, 73° F. for 48 hours before testing. The 0.5 wt. % GMA graft had properties equal or superior to higher levels of GMA in blends of 25 nylon/75 grafted polypropylene. Blends containing 25, 50 and 75 weight percent nylon 6 were compatibilized using the 5 wt. % GMA graft. The grafted blends did not discolor.

TABLE 8

| Sample | A | 1 | 2 | 3 | 4 | 5 | 6 | 7 |
|---|---|---|---|---|---|---|---|---|
| Formulation[a], g | | | | | | | | |
| Nylon 6[b] | 998.0 | 249.5 | 499.0 | 748.5 | — | 200.0 | 200.0 | 200.0 |
| PP-g-P(S-co-GMA) | | | | | | | | |
| 5% GMA | — | 748.5 | 499.0 | 249.5 | 998.0 | — | — | — |
| 2% GMA | — | — | — | — | — | 600.0 | — | — |
| 1% GMA | — | — | — | — | — | — | 600.0 | — |
| 0.5% GMA | — | — | — | — | — | — | — | 600.0 |
| Properties | | | | | | | | |
| Flex. Modulus (MPa) | 2675 | 2434 | 2456 | 2424 | 2490 | 2467 | 2404 | 2458 |
| Flex. Strength (MPa) | 112.4 | 87.1 | 94.9 | 99.1 | 79.2 | 87.9 | 87.1 | 89.1 |
| Notched Izod (J/m) | 48 | 11 | 32 | 34 | 13 | 22 | 21 | 20 |
| Tensile Strength | | | | | | | | |
| Single gated (MPa) | 82.9 | 49.7 | 60.5 | 66.9 | 47.2 | 52.9 | 52.7 | 52.9 |
| Dual Gated (MPa) | 80.8 | 17.0 | 19.9 | 31.5 | 25.1 | 17.7 | 16.9 | 17.4 |
| Weldline Reten. (%) | 98 | 34 | 33 | 47 | 53 | 33 | 32 | 33 |

[a]Samples A, 1–4 stabilized with 1.0 g ea. Irganox 1010 and P-EPQ; Samples 5–7, 0.8 g ea.
[b]Enichem 303HV

EXAMPLE 8

Extraction tests performed on PPE blends confirmed that, as a result of the presence of GMA in the grafted propylene polymer material, PPE content in the insoluble fraction was substantially increased. The blends utilized 7.5 wt. % each of Kraton G1650 and G 1702 and were stabilized with 0.20 wt. % each of Irganox 1010 and P-EPQ. Grafting of the GMA-containing polymer was conducted at 100° C. using 0.5 wt. % Lupersol PMS free radical generator; monomers were added as a mixture of 30 wt. % styrene and 5 wt. % GMA. Prior to extraction with chloroform the pellets were converted to a fine powder using a freezer mill. PPE and PP content are reported as relative absorption values based on Fourier Transform Infra-Red analysis (FTIR). Results are summarized in Table 9.

TABLE 9

| Sample 13- | 1 | 2 |
|---|---|---|
| Formulation, wt. % | | |
| PPE | 56.10 | 56.10 |
| PP-g-pS | 28.00 | — |
| PP-g-P(S-co-GMA) | — | 28.00 |
| Chloroform Extraction[a] | | |
| Soluble (Theory/Actual) | 84.3/78.5 | 81.2/67.7 |
| Insoluble PP | 0.056 | 0.040 |
| Insoluble PPE | 0.01 | 0.07 |

[a]Theoretical values exclude PP and estimated amounts of grafted PP

As demonstrated in the examples above, the compositions in which the styrenic-glycidyl grafted propylene polymer material is used have better overall balance of properties and appearance.

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

We claim:

1. A composition comprising, by weight (a) from about 10 to about 90% of a resin material selected from the group consisting of (i) a polyphenylene ether resin, (ii) a polyamide resin and (iii) a polyester resin; (b) from about 10 to about 90% of a propylene polymer material grafted with styrenic polymer and a glycidyl moiety and further comprising from about 35 to about 95 weight percent of the total grafting monomer of styrenic polymer copolymerized with said glycidyl moiety as a discrete component wherein the total concentration of styrenic and glycidyl moiety monomers added during the grafting of said propylene polymer material is from about 50 to about 200 parts by weight per hundred of said propylene polymer material and said glycidyl moiety monomer is present during said grafting at a concentration of from about 0.1 to about 20.0 weight percent of said total monomer concentration; optionally (c) from about 1 to about 25% of at least one rubber polymer component comprising (1) from about 0 to 100% of at least one of (i) monoalkenyl aromatic hydrocarbon-conjugated diene block copolymers, (ii) hydrogenated products of (i), or (iii) mixtures of (i) and (ii); and (2) from about 100 to 0% of an olefin copolymer rubber; wherein the total amount of (a)+(b) is 100%.

2. The composition of claim 1 wherein (a) is present in an amount from about 20 to about 85%.

3. The composition of claim 1 wherein component (a) is a polyphenylene ether resin present in an amount of from about 20 to about 85%.

4. The composition of claim 1, wherein component (a) is a polyamide resin present in an amount of from about 20 to about 85%.

5. The composition of claim 1, wherein component (a) is a polyester resin present in an amount of from about 20 to about 5%.

6. The composition of claim 1 wherein said glycidyl moiety is selected from the group consisting of glycidyl acrylate, glycidyl methacrylate, glycidyl itaconate, allyl glycidyl ether, 2-methallyl glycidyl ether, and p-styryl glycidyl ether.

7. The composition of claim 1 wherein said glycidyl moiety and styrenic polymer grafted propylene polymer material of said component (b) is selected from the group consisting of a graft copolymer of glycidyl methacrylate and styrene on polypropylene backbone, a graft copolymer of glycidyl methacrylate and styrene on ethylene-propylene random copolymer backbone, a graft copolymer of glycidyl methacrylate and styrene on polypropylene backbone impact modified with ethylene-propylene rubber, a graft copolymer of glycidyl methacrylate and styrene/alpha-methylstyrene on polypropylene backbone impact-modified with ethylene-propylene rubber, a graft copolymer of glycidyl methacrylate and styrene/alpha-methylstyrene on ethylene-propylene random copolymer backbone and a graft copolymer of glycidyl methacrylate and styrene/alpha-methylstyrene on polypropylene backbone.

8. The composition of claim 7 wherein the total glycidyl methacrylate and styrenic monomer during grafting is from about 50 to about 200 parts per hundred and said glycidyl methacrylate is present at a concentration of from about 0.1 to about 20 weight percent of said total monomer content.

9. The composition of claim 1 wherein up to about 90% of the amount of said propylene polymer material grafted with said glycidyl moiety and styrenic polymer of component (b) is replaced with a propylene polymer material grafted with styrenic polymer having a styrenic monomer content of from about 5 to about 70%.

* * * * *

UNITED STATES PATENT AND TRADEMARK OFFICE
CERTIFICATE OF CORRECTION

PATENT NO. : 5,290,856
DATED : March 1, 1994
INVENTOR(S) : Kelvin T. Okamoto et al It is certified that error appears in the above-identified patent and that said Letters Patent is hereby corrected as shown below:

At col. 1, line 13, "hydrocarbon conjugated" should be --hydrocarbon-conjugated--.

At col. 2, line 51, "5 5%" should be --5.5%--.

At col. 6, line 43, after "resins)," insert --Allied (CARPION® resins) and Celanese (7000 series resins),--.

At col. 10, lines 20-21, "hydrocarbon conjugated" should be --hydrocarbon-conjugated--.

At col. 14, line 34, in Table 2, under col. 2 for Flex Strength, "774.9" should be --74.9--.

At col. 19, line 29, "(a)+(b)" should be --(a)+(b)+(c)--.

At col. 20, line 3, "5%" should be --85%--.

Signed and Sealed this

Thirteenth Day of September, 1994

Attest:

BRUCE LEHMAN

Attesting Officer     Commissioner of Patents and Trademarks